(12) United States Patent
Younie et al.

(10) Patent No.: US 7,267,542 B2
(45) Date of Patent: Sep. 11, 2007

(54) MOLDING APPARATUS AND METHOD

(75) Inventors: Mark L. Younie, Snohomish, WA (US); David E. Gideon, Seattle, WA (US); Eugene A. Jackson, Renton, WA (US); David A. Vaughan, Stanwood, WA (US); Michael Kuntz, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 505 days.

(21) Appl. No.: 10/705,873

(22) Filed: Nov. 13, 2003

(65) Prior Publication Data
US 2005/0104248 A1 May 19, 2005

(51) Int. Cl.
*B29C 33/00* (2006.01)

(52) U.S. Cl. ............... 425/389; 425/405.1; 425/456; 425/470

(58) Field of Classification Search ............... 425/3, 425/389, 405.1, 470, 456; 249/134
See application file for complete search history.

(56) References Cited

U.S. PATENT DOCUMENTS

| 2,488,922 | A | * | 11/1949 | Mead | 264/571 |
| 2,513,785 | A | * | 7/1950 | Browne | 264/517 |
| 2,581,489 | A | * | 1/1952 | Kilham | 425/2 |
| 2,770,823 | A | * | 11/1956 | Kamborian | 12/38 |
| 3,620,286 | A | * | 11/1971 | Hofmann et al. | 164/34 |
| 3,883,287 | A | * | 5/1975 | Grawey et al. | 425/405.1 |
| 4,160,003 | A | * | 7/1979 | Kozuka et al. | 264/87 |
| 4,599,062 | A | * | 7/1986 | Konishi | 425/116 |
| 4,931,242 | A | * | 6/1990 | Uchimura et al. | 264/87 |
| 4,943,398 | A | * | 7/1990 | Endo et al. | 264/82 |
| 5,262,121 | A | * | 11/1993 | Goodno | 264/571 |
| 2005/0211870 | A1 | * | 9/2005 | Browne et al. | 249/134 |
| 2006/0137424 | A1 | * | 6/2006 | Browne et al. | 72/377 |

OTHER PUBLICATIONS

Blake, Civil Engineer's Reference Book, 4th edition, Elsevier, Section 37.5.5, 1989.*

* cited by examiner

*Primary Examiner*—Robert B. Davis
(74) *Attorney, Agent, or Firm*—Baker & Hostetler LLP

(57) ABSTRACT

An apparatus and method for making a mold or mold face includes a container having at least one opening. The apparatus also includes a flexible membrane that is retained to the container that extends across the opening of the container. The apparatus for making a mold further includes support media that is disposed within the container along with a vacuum valve that is connected to the container.

22 Claims, 6 Drawing Sheets

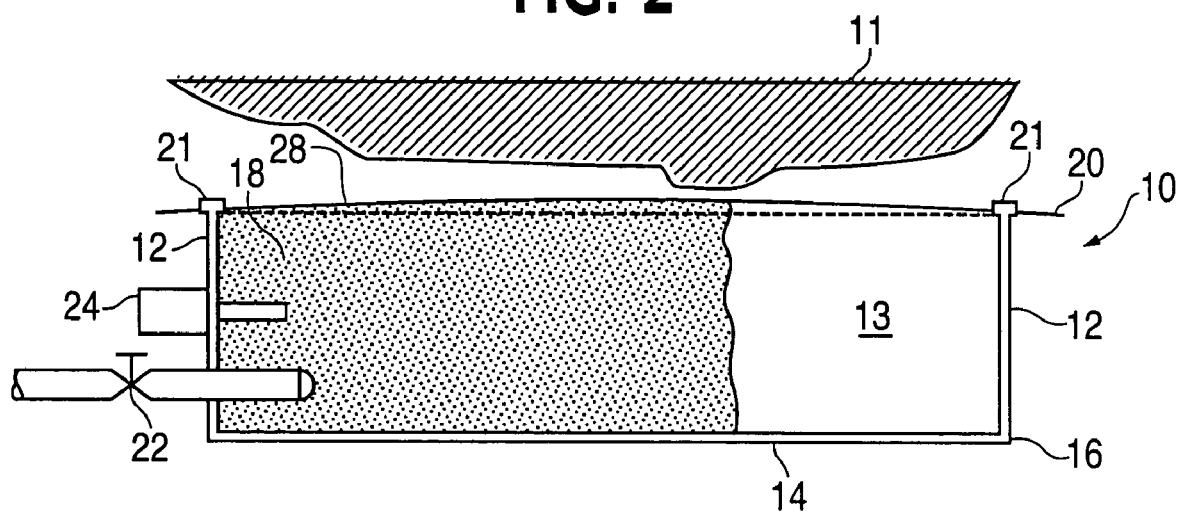
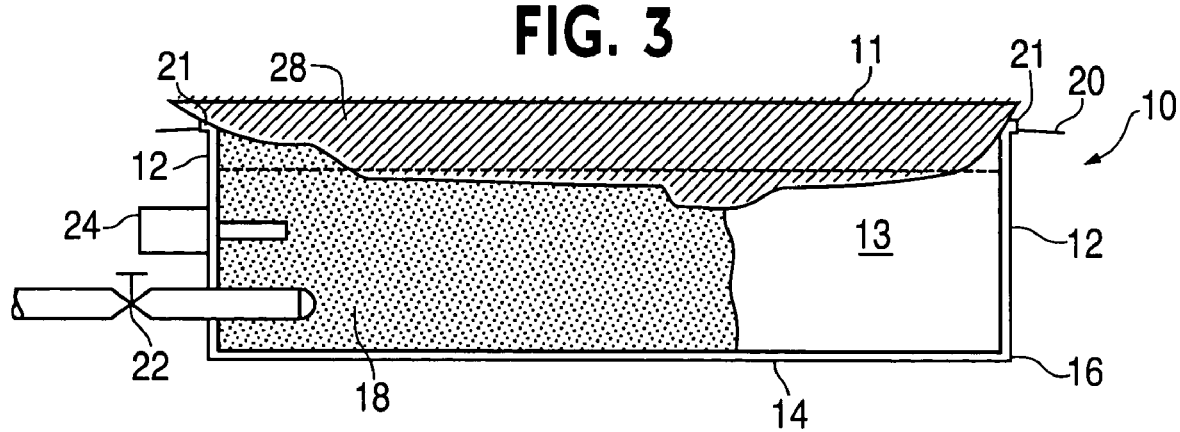

MOLDING APPARATUS AND METHOD

FIELD OF THE INVENTION

The present invention relates generally to the field of molding. More particularly, the present invention relates to an apparatus and method for providing tooling, such as for example a mold or mold face, which can be reconfigured quickly and efficiently to adapt and form a variety of shapes and/or pieces.

BACKGROUND OF THE INVENTION

Molding processes are valuable in industry. For example, during the manufacture of commercial airplanes and the like, many parts of aircraft interiors are manufactured using molding processes that employ matched metal dies. Such manufacturing process oftentimes have high, non-recurring costs for the tooling and related processing equipment required to produce or manufacture the aforementioned metal dies and/or other manufacturing components. These costs may include those associated with forming tools, dies, molds, fixtures and vacuum tools.

The aforementioned matched dies, for example, often require substantial or long lead-time for design and subsequent ordering from outside tooling shops to meet product manufacturing dates. In addition, the dies can be very heavy, very costly, and can require extensive polishing of the tool steel faces before being used, all of which contribute to increased time and cost.

Alternative methods and manufacturing processes for designing and producing the tooling for the production of aircraft interiors does exist, however these alternative processes also have drawbacks.

For example, some alternatives for the design and manufacture of tooling entail creating a master mold by machining the reverse of the part or piece to be produced out of an inexpensive material, then applying hand laid materials to the master mold. Other alternatives also include automated apparatuses that employ a computer controlled array of pin surface shapes to effect a mold surface at the ends of the pins. These alternative design methods also have drawbacks. After the materials are applied to the master mold, they in some cases must be subsequently affixed and cured in an oven, and then subjected to vacuum forces, causing these processes to sometimes be expensive, and very labor and time intensive to achieve desired quality. Similarly, known automated apparatuses tend to be very expensive and in the case of metal pins are limited by the fact that they are two dimensional in shape.

Accordingly, there is a need in the art to provide an apparatus and method that allows for the efficient, inexpensive manufacture of items such as a mold or mold face that is inexpensive. Also, there is a further need for an apparatus and method for molding that can be reconfigured to differ shapes quickly and efficiently.

SUMMARY OF THE INVENTION

The foregoing needs are met, to a great extent, by the present invention, wherein in one aspect an apparatus for making an item is provided, comprising a container that has an interior and at least one opening. The apparatus also includes a flexible membrane retained to the container that extends across the opening to seal the container. The apparatus further includes support media disposed within the container. The apparatus for making an item additionally includes a vacuum valve connected to the container. The vacuum valve allows a vacuum force to be applied to the interior of the container.

In accordance with another embodiment of the present invention, an apparatus for making an item using a mold plug is provided. The apparatus includes a means for providing a tool apparatus which includes a container with support media disposed therein. The container also includes a flexible membrane. The apparatus additionally includes a means for pressing the mold plug against the flexible membrane, causing the flexible membrane to contour to the shape of the mold plug. The means for pressing the mold plug also displaces the support media so that it packs against the mold plug. The apparatus also includes a means for applying a vacuum force to the container to cause the support media to become compacted so that the support media and the flexible membrane substantially retain the shape of the mold plug. The apparatus also has a means for removing the mold plug.

In accordance with yet another embodiment of the present invention, a method for producing an item using a mold plug having a shape is provided, comprising the steps of: providing a tool apparatus including a container with support media disposed therein and a flexible membrane; pressing the mold plug against the flexible membrane to cause the membrane to contour to the shape of the plug, and displacing the support media disposed within the container so that it packs against the mold plug; applying a vacuum force to the container to cause the support media to become compacted so that the support media and the flexible membrane substantially retain the shape of the mold plug; and removing the mold plug.

In accordance with still another embodiment of the present invention, a method for producing an item using a mold plug having a shape is provided, comprising the steps of: disposing a template part within the mold plug; attaching the mold plug to a strong back; providing a tool apparatus including a container with support media disposed therein and a flexible membrane; pressing the mold plug against the flexible membrane to cause the membrane to contour to the shape of the plug, and displacing the support media disposed within the container so that it packs against the mold plug; applying a vacuum force to the container to cause the support media to become compacted so that the support media and the flexible membrane substantially retain the shape of the mold plug; and removing the mold plug.

In accordance with another embodiment of the present invention, an apparatus for making an item is provided. The apparatus includes a container having an interior and at least one opening along with a flexible membrane that is retained to the container. The flexible membrane extends across the opening to seal the interior. The apparatus also includes support media disposed within the container wherein the support media is either an electrorheological or a magnetorheological fluid.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is a partial sectional view of the apparatus depicted in FIG. 1 in combination with a mold plug.

FIG. 3 is a partial sectional view of the apparatus depicted in FIGS. 1 and 2 with the mold plug in contact with the apparatus.

DETAILED DESCRIPTION

Figure 1:
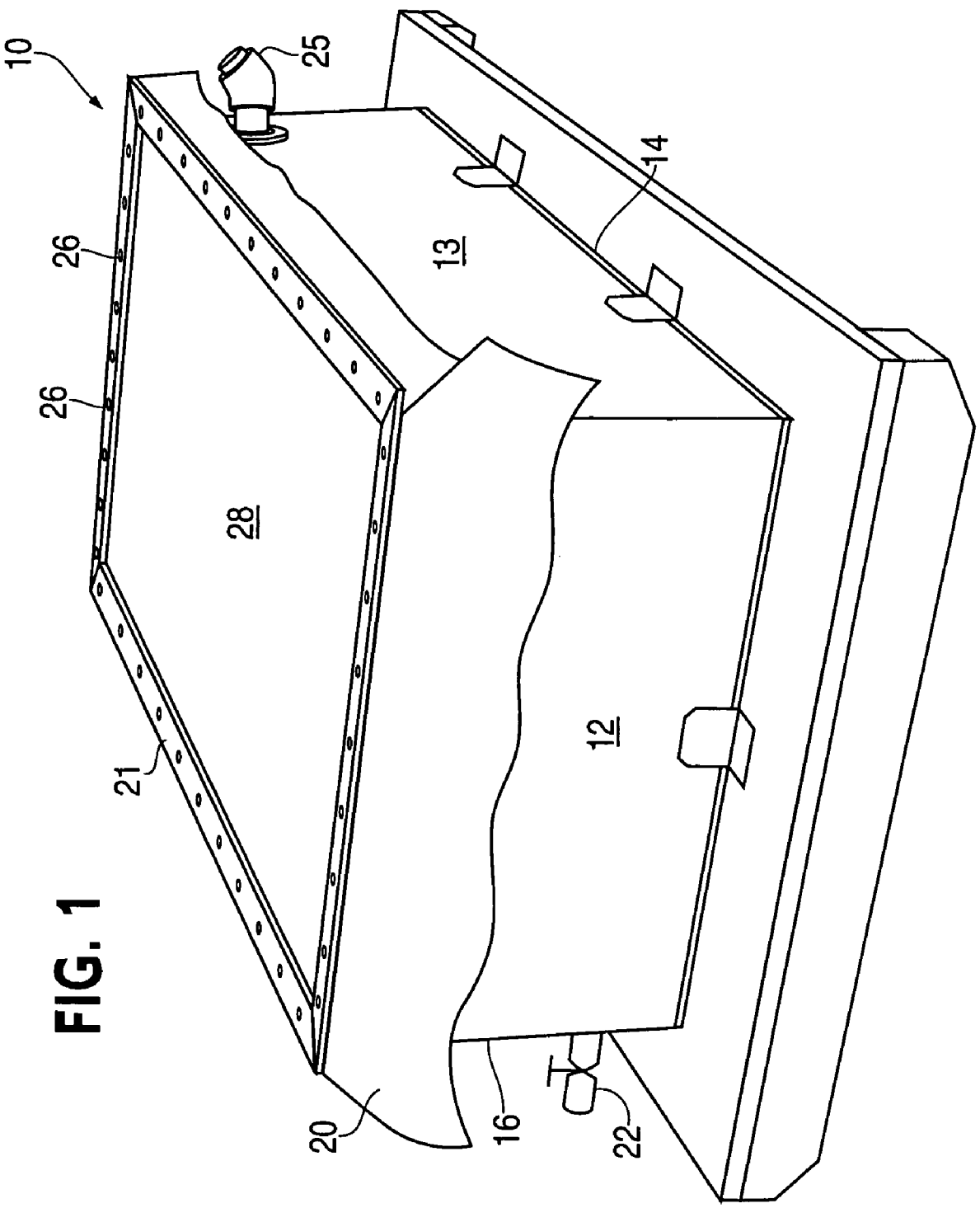
FIG. 1 is perspective view of a tool apparatus in accordance with an embodiment of the present invention.

Various preferred embodiments of the present invention provide for an tool apparatus and method for the production and manufacture of items such as work pieces. The work pieces can include for example, mold dies, mold halves, mold faces, or even finished components. In some arrangements, the apparatus and method are utilized to form molds for forming or manufacturing components that make up the interior linings of commercial aircraft. It should be understood, however, that the present invention is not limited in its application to aircraft manufacture, or the aircraft industry, but, for example, can be used with other manufacturing processes and industries that benefit from a low-cost tool that is capable of producing custom shaped molds and parts. Preferred embodiments of the invention will now be further described with reference to the drawing figures, in which like reference numerals refer to like parts.

Referring now to the figures, FIGS. 1-4 illustrate a tool apparatus, generally designated 10, is depicted in combination with a master mold plug 11. The tool apparatus 10 generally includes two side walls 12, a base 14 and two end walls 13. The side walls 12, base 14 and two end walls 13 combine to form a container or mold box 16, that has an opening on the top. The mold box 16 contains or is filled with support media 18 which will be discussed in further detail below.

As illustrated in FIGS. 1-4, the tool apparatus 10 also includes a flexible membrane sheet 20 that extends between the side walls 12 and end walls 13 to enclose and preferably seal the mold box 16. The tool apparatus 10 also includes a valve 22 that is attached to, and extends through, one of the side walls 12 or end walls 13 along with a vibrating device 24 disposed within the mold box 16. The apparatus 10 also includes a break pipe 25. The valve 22 connects to a vacuum source and is utilized to allow a vacuum force to be applied the interior cavity of the mold box 16. The break pipe 25 functions both as a fill point for the mold box 16 and a vacuum release for releasing the vacuum when it is applied to the mold box 16. The break pipe 25 may be equipped with a valve in accordance with some embodiments of the present invention.

Referring now to FIGS. 1 and 2, the mold box 16 as previously described, is constructed from two opposing side walls 12 that are connected to, and extend upwardly from, the base 14. The side walls 12 are connected to the end walls 13 which are also connected to, and extend upwardly from, the base 14. In the example illustrated in the figures, the mold box 16 is shown as a square or rectangular in shape. Though mold boxes 16 having rectangular or square dimensions are typically preferred, the present invention encompasses alternative mold box embodiments that are not square or rectangular in shape such as circular container. The mold box 16 is preferably constructed from metal or metal alloy materials that minimize or resist the likelihood of any sort of deflection or distortion that may occur under pressure during the molding process. The mold box 16 may be alternatively constructed from non-metallic materials that are sufficiently rigid and/or stiff.

As depicted in FIGS. 1-4, the flexible membrane 20 is constrained at its edges to the respective side walls 12 and end walls 13 to form a seal, but configured such that it retains some movement flexibility that allows for the master male mold plug 11 to be pressed into the mold box 16. The flexible membrane 20 is preferably constrained to the side walls 12 and end walls 13 via a clamp or retaining ring 21 that extends about the perimeter of the mold box 16.

Referring specifically to FIG. 1, in the embodiment depicted the retaining ring 21 is constructed from a thin piece of rigid material such as plastic, metal, medium density fiberboard (MDF) and the like. The retaining ring 21 has a series of countersunk holes 26 spaced closely to one another about the perimeter of the of the retaining ring 21. The retaining ring 21 in a preferred example has a thickness of approximately 0.025", however, this thickness may be greater or less. The flexible membrane sheet 20 is retained or attached to the mold box 16 via screws (not pictured) that are inserted through the holes 26 of the retaining ring 21. The screws are inserted through the holes so that they perforate the edge of the flexible membrane sheet 20, connecting the membrane 20 to the mold box 16. The edges of the flexible sheet may be slightly thicker than the rest of flexible membrane sheet 20, which can reduce the likelihood of the sheet 20 slipping laterally when the plug 11 is applied. Prior to attachment of the retaining ring 21, a sealant, such as a silicone sealant, may be applied to the edge of the mold box 16 and the bottom of the retaining ring 21 to assist in the sealing of the mold box 16.

The flexible membrane sheet 20 may alternatively be constrained to the side walls 12 and end walls 13 via other attachment means such as bolt, bracket and/or screw. The flexible membrane sheet 20 is constructed from a durable, elastic material, preferably silicone rubber or similar material that resists wear and is flexible.

Figure 4:
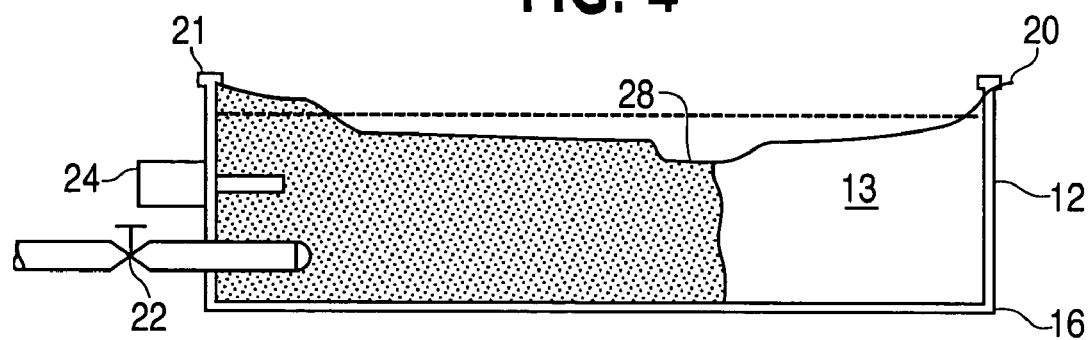
FIG. 4 is partial sectional view of the apparatus depicted in FIGS. 1 and 3 after the mold plug has been removed.

Referring now to FIGS. 2-4, the mold box 16 is filled with support media 18. The support media 18 is preferably ceramic support media that includes ceramic pellets or spheres 18. The ceramic pellets or spheres 18 function as filler material behind the flexible membrane 20 and apply a force against the flexible membrane 20. The ceramic pellets or spheres 18 are preferably round ball-like components that react similar to a liquid or fluid by packing tightly around and up against, the flexible membrane 20 under increasing pressure within the mold box 16 when the male mold plug 11 is applied. The pellets or spheres 18 in one example are preferably Macrolite® Ceramic Spheres that range in size from approximately 0.020 inches to approximately 0.25 inches in diameter. Although Macrolite® Ceramic Spheres are preferred, any type of suitable support media known in the art may be utilized. Also, the design and detail required by the mold to be produced, which is generally dictated by the detail and design of the part or piece to be molded, helps determine a suitable granularization or size of the media 18 employed in the mold box 16. Larger sized media 18 may be utilized when less detail is desired and smaller sized media 18 may be utilized when more detail is desired.

Alternative support media 18 may be utilized with the tool apparatus 10. For example, a suitable electrorheological or magnetorheological fluid may be used as a support media behind the flexible membrane 20 instead of ceramic pellet or sphere type media. When employing one of the aforementioned fluids, a vacuum force is typically not required. Instead, an electrical or magnetic field is applied to the fluid and upon application of one of these fields, the properties of the fluid allows it to solidify to a solid material, providing a mold for tooling.

The tool apparatus 10 may also employ a vibrating device 24 or devices in accordance with an embodiment of the present invention, as depicted in FIGS. 2-5. As illustrated in FIGS. 2-4, the vibrating device 24 is disposed on a side of the mold box 16, however it may alternatively be submerged or suspended in the media 18. The side mount vibrating device 24 is preferably a Vibra-Flow fluidifying vibration device, however any vibration device known in the art may be employed. During operation of the tool apparatus 10, the vibrating device 24 functions to assist in displacing and/or packing the media 18 around the male mold plug 11 when it is inserted into the flexible membrane 20. Though utilization of a vibrating device 24 is typically preferred, it is not needed in all embodiments for proper operation of the tool apparatus 10. Alternatively, the tool apparatus 10 may employ multiple vibrating devices 24.

Figure 5:
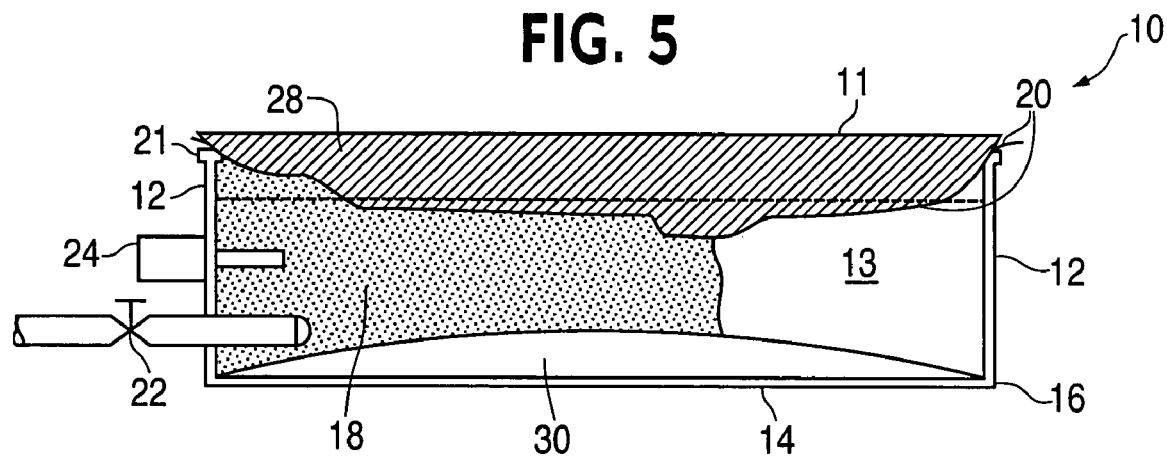
FIG. 5 is a partial sectional view of a machined mold plug in contact with a apparatus in accordance with an alternative embodiment of the present invention.

Referring now to FIGS. 1-4, the operation of the tool apparatus 10, will now be described in further detail. A male mold plug 11, such as the one depicted in FIGS. 2, 3 and 5, is machined or manufactured using standard techniques known in the art to form the desired shape of the part or component to be molded. The male mold plug 11 is applied or pressed into the flexible membrane sheet 20 to form an impression of a desired shape complimentary to the shape of the male mold plug 11. The compression shape may be, for example, a desired mold face. As the male mold plug 11 is pressed into the flexible membrane 18, and as it proceeds to be forced into the mold box 16, the support media 18 is displaced, contouring to the shape and surface design of the male mold plug 11. As the male mold plug 11 further projects into the flexible membrane sheet 20 and into the mold box 16, it causes the individual spheres 18 to be further displaced and to tightly pack around and abut against the male mold plug 11. Next, the media 18 is preferably agitated by the vibrator 24 to further displace the individual pellets or spheres of the media 18.

Next, with the male mold plug 11 still applied, the flexible membrane sheet 20 and the media 18 are allowed to come to equilibrium. Once equilibrium is attained, the vacuum valve 22 is opened, applying a vacuum force to the sealed mold box 16. The vacuum may alternatively be applied during media 18 displacement. This vacuum force acts to cause the individual spheres of the media 18 to be held in place and collectively rigidized by packing, forming a generally solid block of material behind the flexible membrane sheet 20 that is of a shape that is complimentary to at least a great extent, to the shape of the male mold plug 11. The aforementioned shape is retained by closing the vacuum valve 22 to maintain the vacuum on the on the media 18.

The male mold plug 11 is then removed from the mold box 16. The outer surface, generally designated 28, of the flexible membrane 20 may now be used as either as the finish face surface for an open mold or one half of a closed mold. The outer surface 28 may now be utilized as an open face mold wherein a substrate such as polyurethane foam may be applied by spray application. The tooling apparatus 10 may alternatively may employed in molding processes such as reaction injection molding (RIM), which is described below with reference to FIGS. 8-12.

Returning to FIGS. 1-4, the mold box 16 and the outer surface 28 retain their shape, allowing a series of sequential parts to be molded. Once the run of parts or molding of the parts using the tool apparatus 10 is complete, the flexible membrane 20 is returned to its original state by removing the vacuum force, via the valve 22 and/or break pipe 25, and allowing the media 18 to return to its natural state.

Referring now to FIG. 5, an alternative embodiment of a flex tool apparatus 10 is depicted having an air bladder or bottom membrane 30 disposed within the mold box 16 on the base 14. During operation, the air bladder 30 is pressurized via a pressurized air source while the vacuum force is applied to the mold box 16. The air bladder 30 functions in combination with the vacuum force, as described above, to enhance the packing of media 18 against the male mold plug 11.

Figure 6:
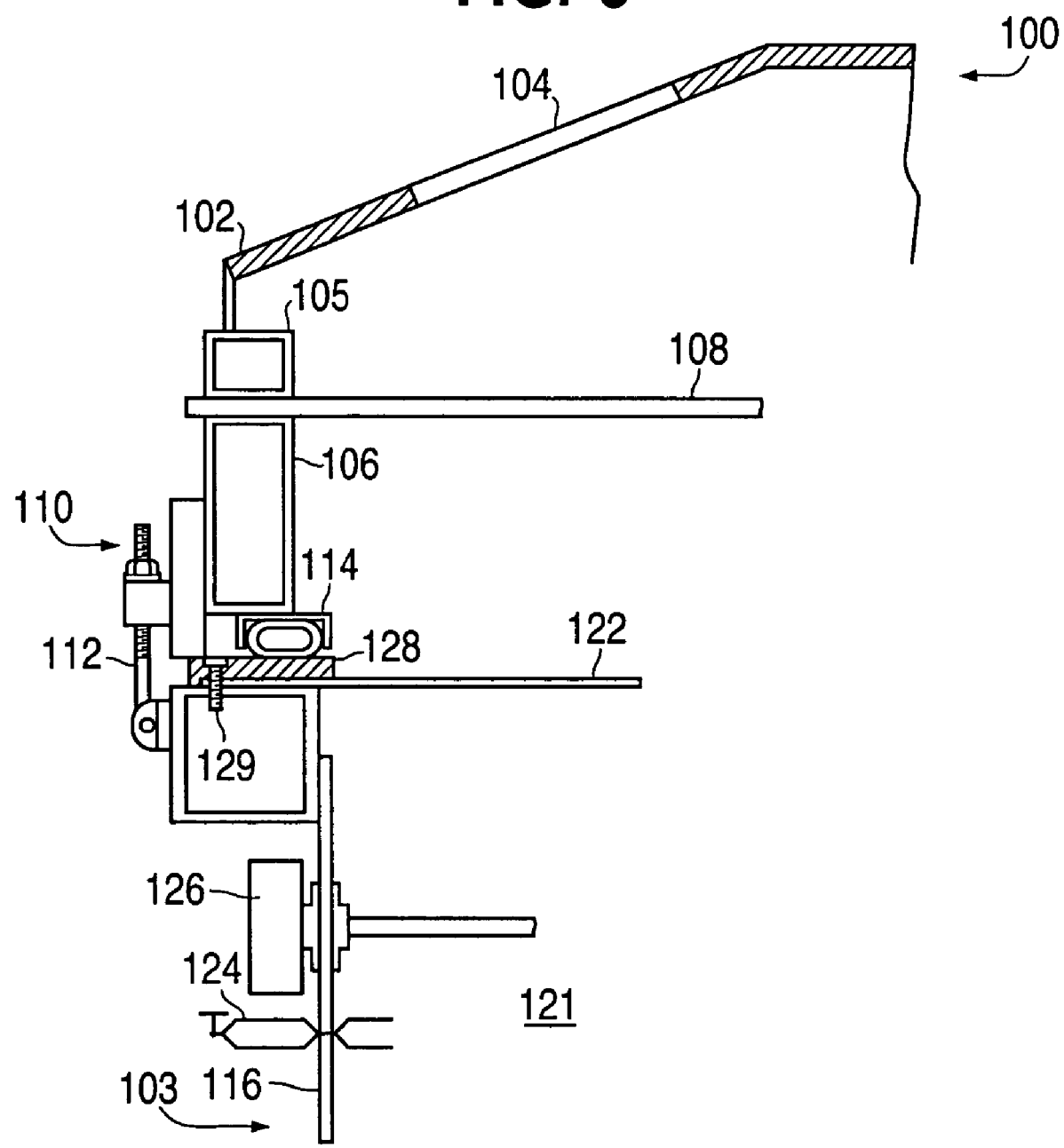
FIG. 6 is a partial side sectional view of an apparatus in accordance with an embodiment of the present invention.
Figure 7:
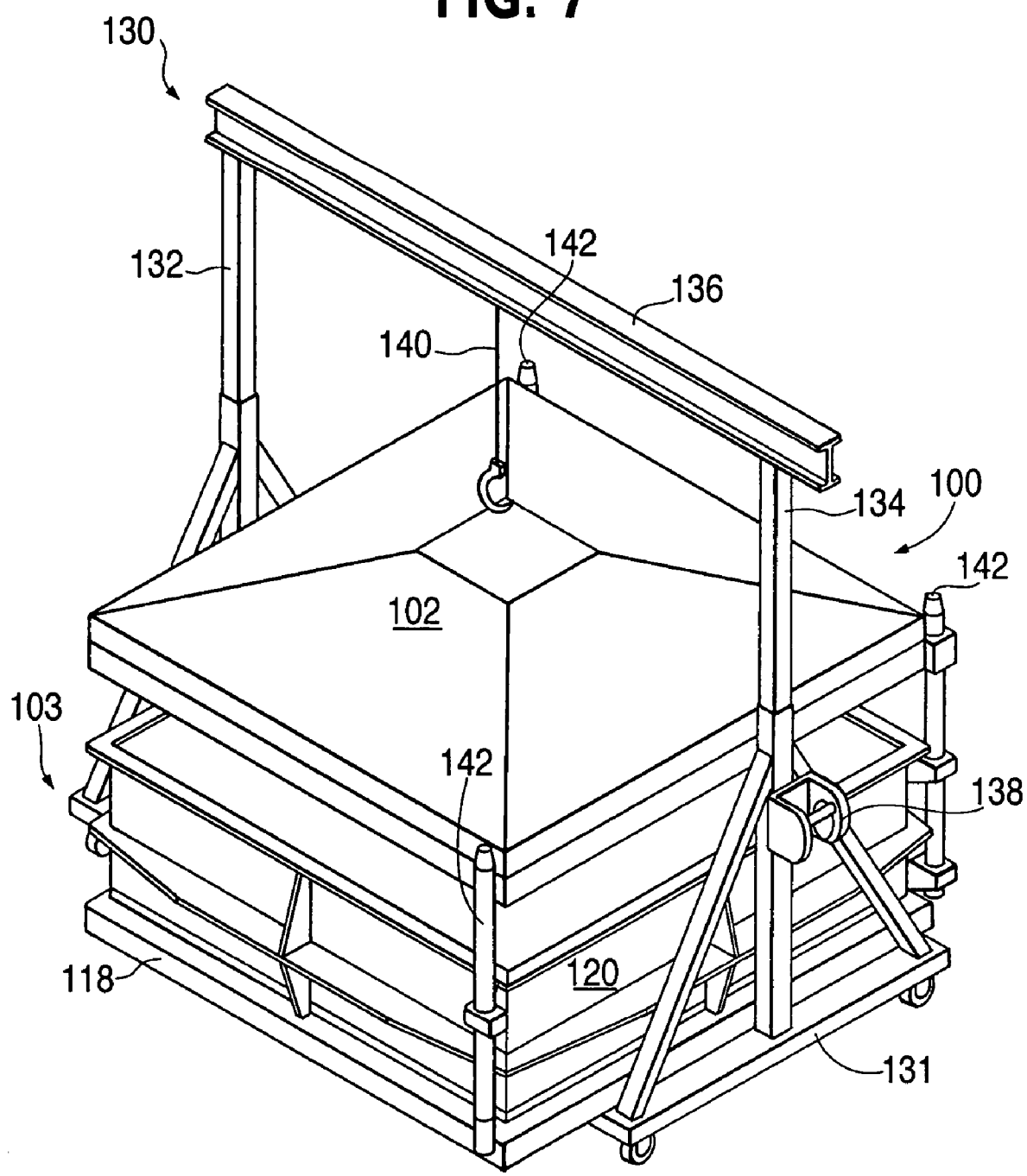
FIG. 7 is a perspective view of a tool apparatus in accordance with an alternative embodiment of the present invention.

Referring now to FIGS. 6 and 7, a tool apparatus, generally designated 100, is illustrated in accordance with an alternative embodiment of the present invention. The apparatus 100 has a top portion 102 and lower portion or mold box 103. The top portion 102 has an access hole or holes 104 and an upper support bar 105 and a lower support bar 106. The top portion 102 also includes a strongback 108 that is disposed between, and supported by, the upper and lower support bars 105, 106. The strongback 108 is preferably a grid structure to which mold plugs may be fastened. The top portion 102 additionally includes a latch assembly 110 that includes a hinged screw and bolt 112 and a seal 114 sealing between the top portion 102 and the mold box 103.

As similarly described in the previous embodiments illustrated in FIGS. 1-5, the tool apparatus 100 generally includes two side walls 116, a base 118 and two end walls 120. The side walls 116, base 118 and two end walls 120 combine to form the lower portion or mold box 103 that is a box having an opening on the top. The mold box 103 retains or is filled with support media 121.

As illustrated in FIGS. 6 and 7, the apparatus 100 also includes a flexible membrane sheet 122 that extends between the side walls 116 and end walls 120 to enclose and seal the mold box 103. The flex tool apparatus 100 also includes a vacuum valve 124 that is attached to, and extends through, one of the side walls 116. The tool apparatus 100 also includes a vibrating device 126 or devices disposed within the mold box 103. The vacuum valve 124 connects to a vacuum source and is utilized to allow a vacuum force into the mold box 103.

Like the previously described embodiments, the flexible membrane sheet 122 is preferably constrained to the side walls 116 and end walls 120 via a clamp or retaining ring 128 that extends the perimeter of the mold box 103. The retaining ring 128 is preferably a thin piece of rigid material such as plastic, metal, medium density fiberboard (MDF) and the like. The retaining ring has a series of countersunk holes (not pictured). The countersunk holes are spaced closely to one another about the perimeter of the of the retaining ring 128. The flexible membrane sheet 122 is retained to or attached to the mold box 103 via screws 129 that are inserted through the holes so that they perforate the edge of the flexible membrane sheet 122. The retaining ring 128 has a thickness of approximately 0.025" but this thickness may be greater or less, depending on the application.

Referring now to FIG. 7, the tool apparatus 100 in combination with a lifting or support frame assembly, generally designated 130, to which the top portion 102 may be attached. The support frame assembly includes first column 132 and a second column 134, each connected to the bottom 131 of the assembly 130. The support frame assembly 130 also includes a beam 136 that spans between the first and second columns 132, 134 and the pulley 138 for lowering and raising the top portion 102 via a cable 140. The tool apparatus 100 also includes guides of guide posts or index pins 142 positioned along the four corners of the lower portion 103 for guiding the top portion 102 when it is lowered and/or raised. The index pins 142 are used to provide a repeatable, close-tolerance interface between the lower portion and the top. The lifting or support assembly 130 may also include rolling components mounted to the bottom 131 such as wheels that allow the lifting or support assembly 130 to be mobile. The apparatus 100 may also include an air bladder as described in previous embodiments.

During operation of the tool apparatus 100, a male mold plug is attached to the strongback 108 and the top portion 102 is lowered via the pulley 138 and cable 140 toward the lower portion such that the male mold plug is pressed against the flexible membrane 122. As the top portion 102 is lowered onto the lower portion 103 of the apparatus 100, the plug is pushed further into the membrane 122 and the seal 114 contacts the retaining ring 128, providing a seal between the top portion 102 and the lower portion 103. This seal is maintained and/or tightened via the latching assembly 110 when the screw and bolt are engaged once the top portion 102 has been completely lowered. Once the top portion 102 of the apparatus is completely lowered, the tool apparatus 100 functions similarly to the embodiments illustrated in FIGS. 1-5.

Figure 8:
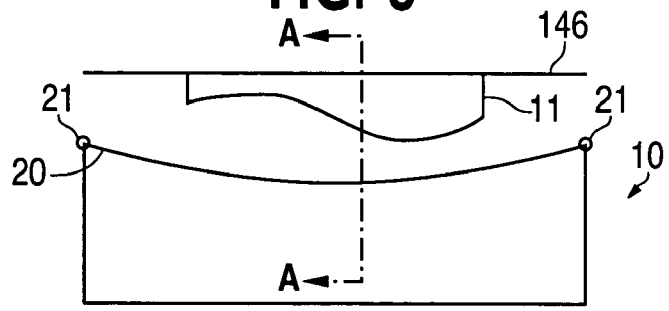
FIG. 8 is a side view of a tool apparatus in combination with a male mold and strongback in accordance with an alternative embodiment of the present invention.
Figure 9:
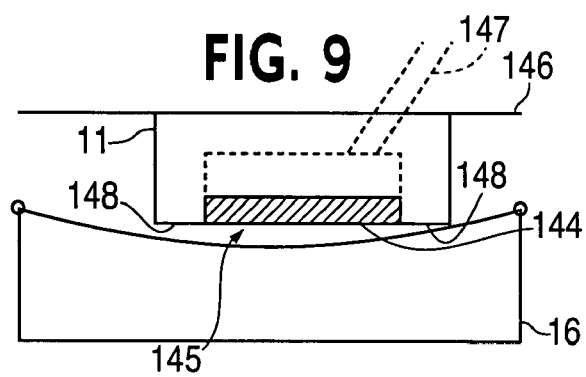
FIG. 9 is a sectional view of the tool apparatus depicted in FIG. 8 taken along line A-A with a part inserted into the male mold.

Referring now to FIGS. 8-12, the tool apparatuses 10 and 100 may be employed in molding applications wherein a closed mold is desired. The figures schematically illustrate a series of steps in a molding process in which the tool apparatus 10 and 100 may be employed. However, for purposes of clarity, only tool apparatus 10 is depicted. FIGS. 8 and 9 specifically depict the tool apparatus 10 in combination with the male mold plug 11. In the embodiment depicted, the male mold plug 11 is cast by methods know in the art, such as plaster splash, or the like, to a model of a part or component 144 to be made. This model part 144 is oftentimes referred to as the "dummy part." During the casting process, the dummy part 144 is placed in a dam or frame where it is engulfed with plaster or ceramic material on five of its six sides. As a result of this process, a five sided, hollow male mold plug 11 is produced wherein the sixth side is open, as indicated by reference numeral 145 in FIGS. 9-12. In the embodiment depicted, the male mold plug 11 is attached to a rigid, universal strongback 146, or in the embodiment depicted in FIG. 7, it may be attached to the grid 108. The male mold plug 11 also includes a gating system 147 for carrying out a mold process. The depiction of the gating 147 is exemplary only, and the male mold plug 11 may include multiple gating paths, a single gating path in an alternative location and/or a gating system located within the tool apparatus 10. Alternatively, the gating system may be disposed in the mold itself. Furthermore, the embodiments depicted in the figures may also include cast hardware or insert blocks that can be disposed or inserted into the mold during the molding process.

Referring now to FIG. 9, a cross-sectional view of FIG. 8 taken along line A-A is illustrated depicting the dummy part 144 disposed within the male mold plug 11. The dummy part 144 is retained within the male mold plug 11 by applying a vacuum force across the upper surface of the dummy part 144, preferably via a series vacuum grooves or slots cut into the backside of the male mold plug 11. As illustrated in FIG. 9, the dummy part 144 completely fills the hollow of the cavity of the male mold plug 11 to blend flush with the outer surfaces 148 of the male mold plug 11. These outer surfaces 148 provide a flat surface to create an effective seal between the male mold plug 11 and the flexible membrane sheet 20 during the molding process.

Figure 10:
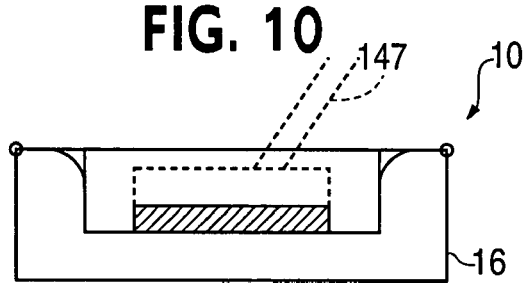
FIG. 10 is a sectional view of the apparatus depicted in FIGS. 8 and 9 with the male mold in contact with the tool apparatus.

Similar to the previous embodiments described, the male mold plug 11, with dummy part 144 retained therein, is lowered along the index pins 142 to contact the outer surface 28 of the flexible membrane sheet 20 as illustrated in FIG. 10. In this position, the male mold plug 11 forms an impression of a desired shape complimentary to the shape of the male mold plug 11. The support media 18 may then be agitated or bubbled via the vibrator or vibrators 24 to further displace in individual pellets or spheres of the support media 18. Also, the tool apparatus 10 can employ an air bladder 30, as previously described, which can assist to further stimulate the individual pellets or spheres of the support media 18. A vacuum force is next applied to the mold box 16 during media 18 displacement or after the media reaches equilibrium, as previously described, to cause the individual spheres of the support media 18 to be held in place and collectively rigidized to form a solid block of material behind the flexible membrane 20, complimentary to the shape of the male mold plug 11.

Figure 11:
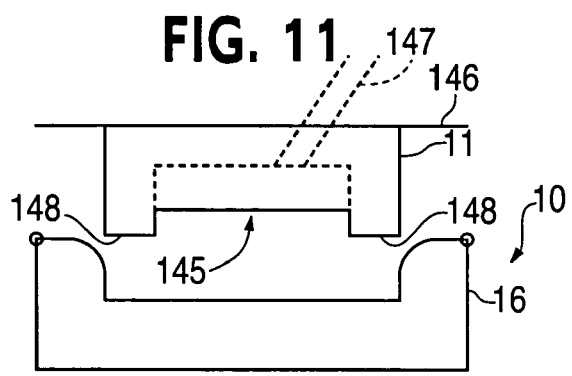
FIG. 11 is a sectional view of the apparatus depicted in FIGS. 8-10 with the part removed from the male mold.
Figure 12:
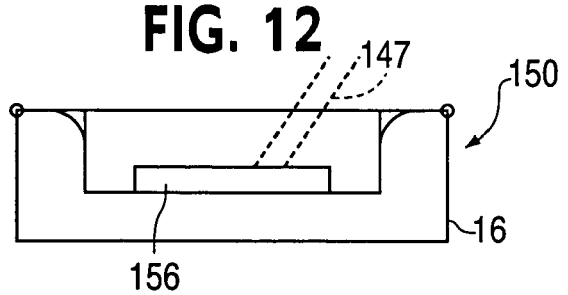
FIG. 12 is a sectional view of the male mold and strongback in combination with the tool apparatus in accordance with an embodiment of the present invention.

As depicted in FIG. 11, the male mold plug 11 and strongback 146 are then withdrawn from the mold box 16 and the dummy part 144 is removed from the male mold plug 11. Referring now to FIG. 12, the male mold plug 11 and strongback 146 are again lowered back into the mold box 16, coming to rest on the previously formed solid block of material and flexible membrane 20, creating a closed mold, generally designated 150, having a hollow cavity 156. The outer edges 148 of the male mold plug 11 contact the flexible membrane 20 to create a seal. In addition, the strongback 146 may be attached or connected to the mold box via a bracket of clamp (not pictured), preventing the likelihood of movement of the male mold plug 11 during the molding process.

Next, the molding process may commence. The closed mold 150 can preferably be used with liquid molding processes such as reaction injection molding (RIM) processes. During this process, the hollow cavity 156 of the closed mold 150 is filled with molding substrate or material via the gating system 147. The molding substrate is polyurethane foam, or similar substrate, that is fed into the closed mold 150, via the gating system 147. Preferably, the substrate is a two-part polyurethane mix that is fed or injected into the mold, wherein the two parts chemically react while in the hollow cavity 156 of the mold 150. Once the polyurethane material cures, the finished part may be removed from the mold 150 by removing the male mold plug 11 and the assistance of a standard removal agent.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for making an item corresponding to a mold plug, comprising:
   a container having an interior and at least one opening;
   a flexible membrane retained to said container that extends across said opening to seal said interior;
   support media disposed within said container in said interior;
   an inflatable air bladder disposed within said container to urge the support media towards the mold plug; and
   a valve connected to said container that allows a vacuum force to be applied to said interior of said container.

2. The apparatus according to claim 1, wherein said support media comprises ceramic pellets.

3. The apparatus according to claim 1, wherein said support media comprises ceramic spheres.

4. The apparatus according to claim 2, wherein grains of said ceramic pellets have a size ranging in diameter of approximately 0.020" to approximately 0.25".

5. The apparatus according to claim 1, wherein said container comprises:
   a base;
   a first side wall connected to said base that extends upward from said base;
   a second side wall connected to said base that extends upward from said base, wherein said second side wall opposes said first side wall;
   a third side wall connected to said base that extends upward from said base, wherein said third side wall space between first side wall and said second side wall; and
   a fourth side wall connected to said base that extends upward from said base, wherein said fourth side wall opposes said third side wall.

6. The apparatus according to claim 1, wherein said container is generally box shaped.

7. The apparatus according to claim 1, wherein said flexible membrane comprises a silicone, rubber membrane.

8. The apparatus according to claim 1, further comprising a vibrating device mounted to said container that vibrates said media disposed within said container.

9. The apparatus according to claim 1, further comprising a vibrating device submerged within said media that vibrates said media disposed within said container.

10. The apparatus according to claim 1, further comprising a retaining ring that retains said flexible membrane to said container.

11. The apparatus according to claim 10, wherein said retaining ring is constructed at least partially from plastic, metal and/or medium density fiberboard (MDF).

12. The apparatus according to claim 1, further comprising a supply of pressurized air in fluid connection with the inflatable air bladder disposed within said container.

13. The apparatus according to claim 1, further comprising a top, removably mounted onto said container.

14. The apparatus according to claim 13, further comprising a latching system that latches said top onto said container.

15. The apparatus according to claim 13, further comprising a seal mounted to said top, wherein said seal provides a seal between said top and said container.

16. The apparatus according to claim 13, further comprising a support frame assembly that translates said top to a mounted position on said container.

17. The apparatus according to claim 16, wherein said frame support assembly translates said top to an unmounted position.

18. The apparatus according to claim 16, wherein said frame support assembly comprises a pulley system.

19. The apparatus according to claim 13, further comprising:
   a first guide post connected to said container; and
   a second guide post connected to said container.

20. The apparatus according to claim 19, further comprising a third guide post connected to said container that opposes said first guide post.

21. An apparatus for making an item using a mold plug, comprising:
   means for providing a tool apparatus including a container with support media disposed therein and a flexible membrane;
   means for pressing the mold plug against the flexible membrane to cause the flexible membrane to contour to the shape of the mold plug, and displacing the support media disposed within the container so that it packs against the mold plug;
   means for inflating an air bladder disposed within the tool apparatus to urge the support media towards the mold plug and enhance the packing of the support media against the mold plug;
   means for applying a vacuum force to the container to cause the support media to become compacted so that the support media and the flexible membrane substantially retain the shape of the mold plug; and
   means for removing the mold plug.

22. An apparatus for making an item from a mold plug, comprising:
   a container having an interior and at least one opening;
   a flexible membrane retained to said container that extends across said opening to seal said interior; and
   support media disposed within said container in said interior, wherein said support media is an electrorheological or magnetorheological fluid; and
   an air bladder disposed within the container to receive pressurized air, wherein the air bladder urges the support media towards the mold plug to enhance packing of the support media against the mold plug.

* * * * *